United States Patent [19]

Wirth et al.

[11] Patent Number: 4,725,138
[45] Date of Patent: Feb. 16, 1988

[54] OPTICAL WAVEFRONT SENSING SYSTEM

[75] Inventors: Allan Wirth, Bedford; Julius Feinleib, Cambridge; Lawrence E. Schmutz, Watertown; Douglas H. Rapkine, Somerville; Robert F. Dillon, Belmont; John J. Hizny, North Billerica, all of Mass.

[73] Assignee: Adaptive Optics Associates Incorporated, Cambridge, Mass.

[21] Appl. No.: 736,933

[22] Filed: May 22, 1985

[51] Int. Cl.⁴ .................................................. G01J 1/20
[52] U.S. Cl. ..................................... 356/121; 250/201; 250/237 R
[58] Field of Search ............ 356/121; 250/201, 237 R, 250/237 G

[56] References Cited

U.S. PATENT DOCUMENTS

| | | | |
|---|---|---|---|
| 3,551,681 | 12/1970 | Astheimer | 250/237 R |
| 3,731,103 | 5/1973 | O'Meara | 250/199 |
| 3,861,801 | 1/1975 | Peters et al. | 356/74 |
| 3,904,274 | 9/1975 | Feinleib et al. | 350/161 |
| 3,923,400 | 12/1975 | Hardy | 356/107 |
| 3,975,629 | 8/1976 | O'Meara | 250/201 |
| 3,979,585 | 9/1976 | O'Meara | 250/201 |
| 3,980,879 | 9/1976 | O'Meara | 250/201 |
| 3,988,608 | 10/1976 | O'Meara | 250/201 |
| 4,016,415 | 4/1977 | OMeara | 250/201 |
| 4,141,652 | 2/1979 | Feinleib | 356/121 |
| 4,248,504 | 2/1981 | Albertinetti et al. | 350/360 |
| 4,399,356 | 8/1983 | Feinleib et al. | 250/201 |
| 4,438,330 | 3/1984 | Hardy | 250/201 |
| 4,441,019 | 4/1984 | Hardy | 250/201 |
| 4,472,029 | 9/1984 | Hardy | 350/360 |
| 4,575,248 | 3/1986 | Horwitz et al. | 356/359 |

OTHER PUBLICATIONS

Hardy, J. W. et al., (Mar. 1977), "Real-time Atmospheric Compensation", *J. Opt. Soc. Am.*, vol. 67, No. 3, pp. 360–369.
Schmutz, L. E. et al., (1979), *SPIE vol. 179 Adaptive Optical Components* II, pp. 75–80.

Primary Examiner—F. L. Evans
Attorney, Agent, or Firm—Hamilton, Brook, Smith & Reynolds

[57] ABSTRACT

A wavefront sensor for detecting distortion in light wavefronts is described in which the wavefront is divided into a plurality of subapertures and light amplified or intensified and imaged as spots of light from each subaperture onto a filter mask. The filter mask encodes a predetermined function of the spot intensity distributor onto the light intensity of the spot transmitted through the filter. For spot centroid calculation, the function is linearly variable. Mask embodiments include linearly varying alternate opaque and transparent chevrons, electronically variable chevrons, and quadratically varying chevrons.

27 Claims, 22 Drawing Figures

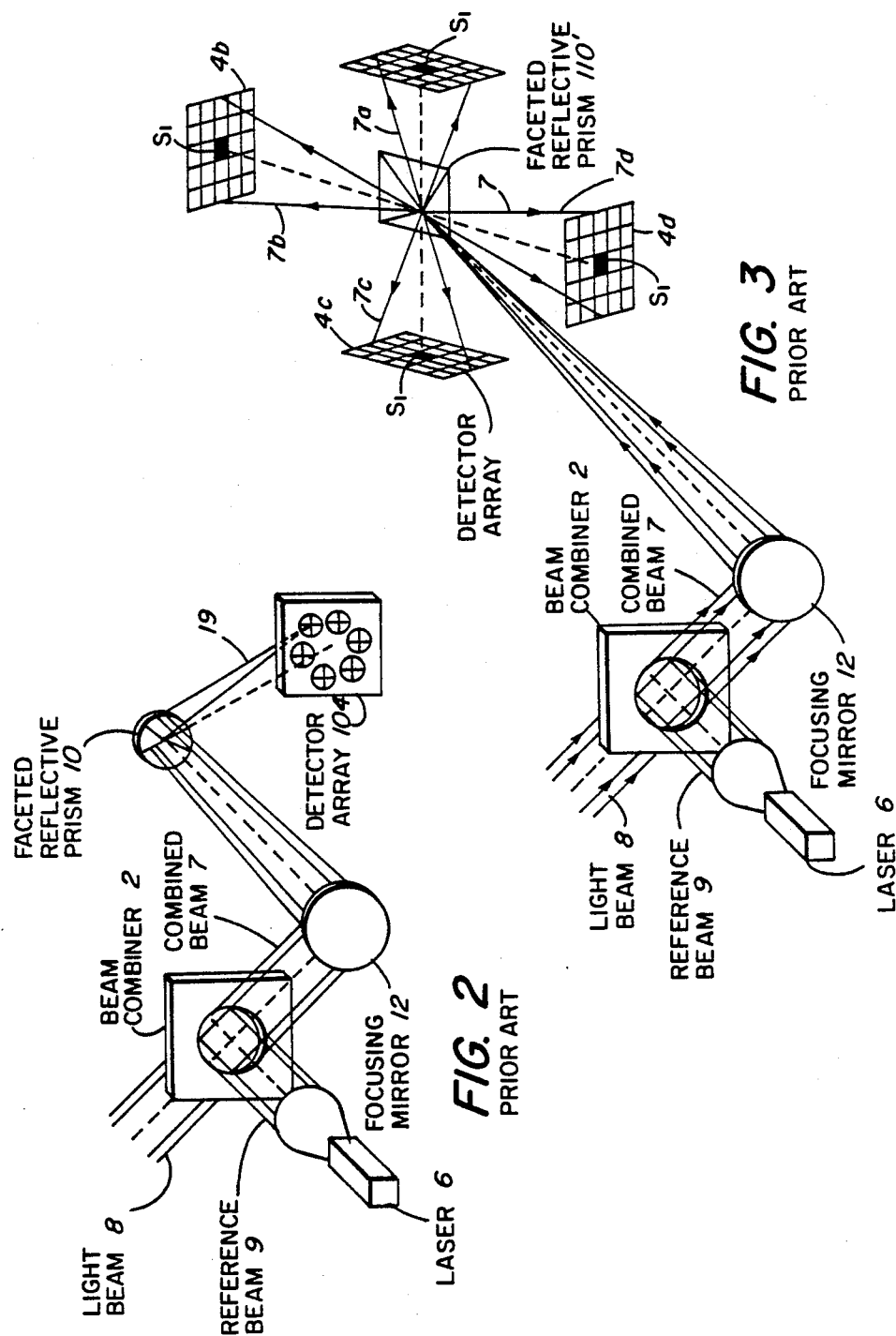

EXAMPLE OF AXIALLY SYMMETRIC MASK

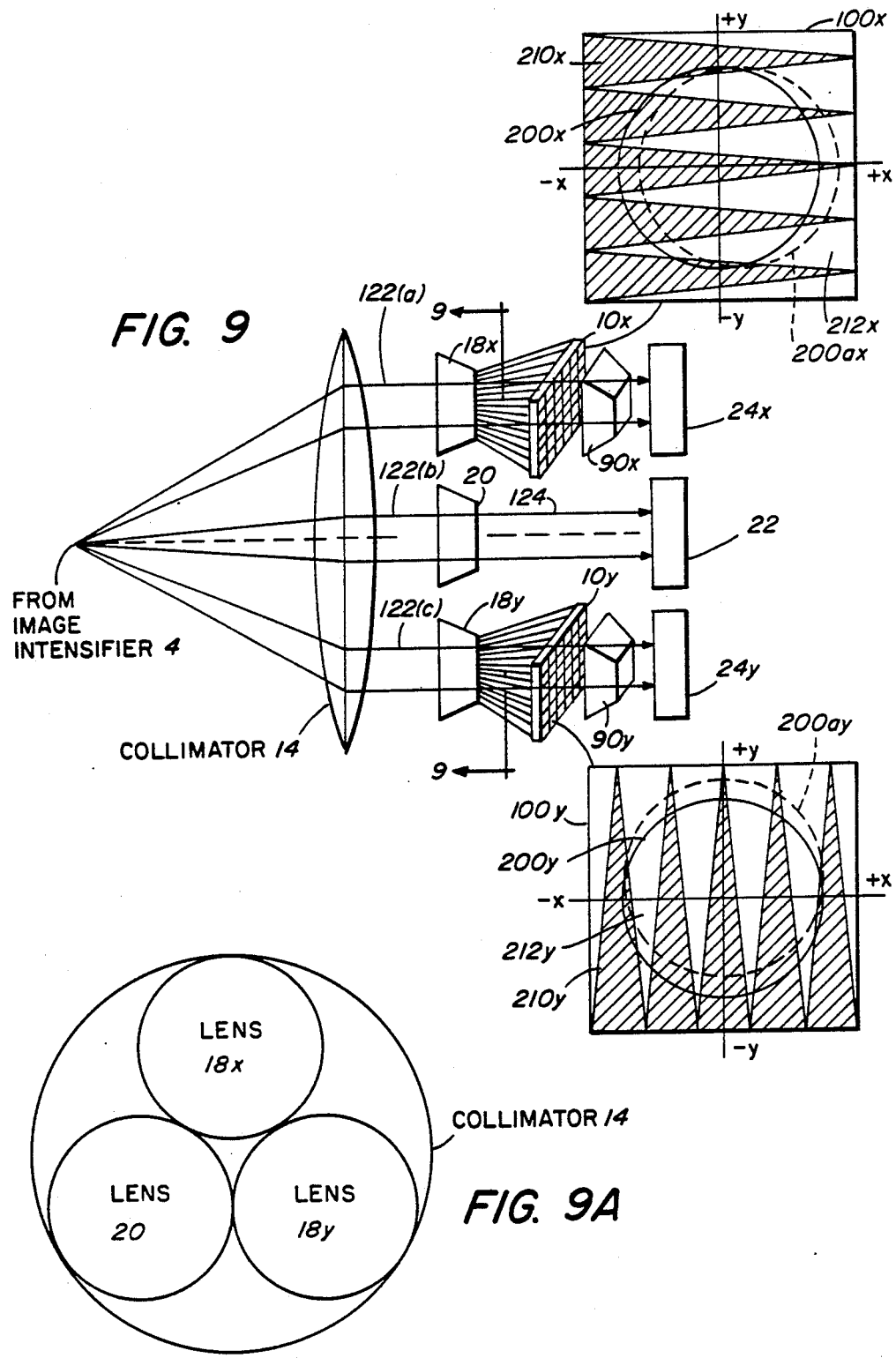

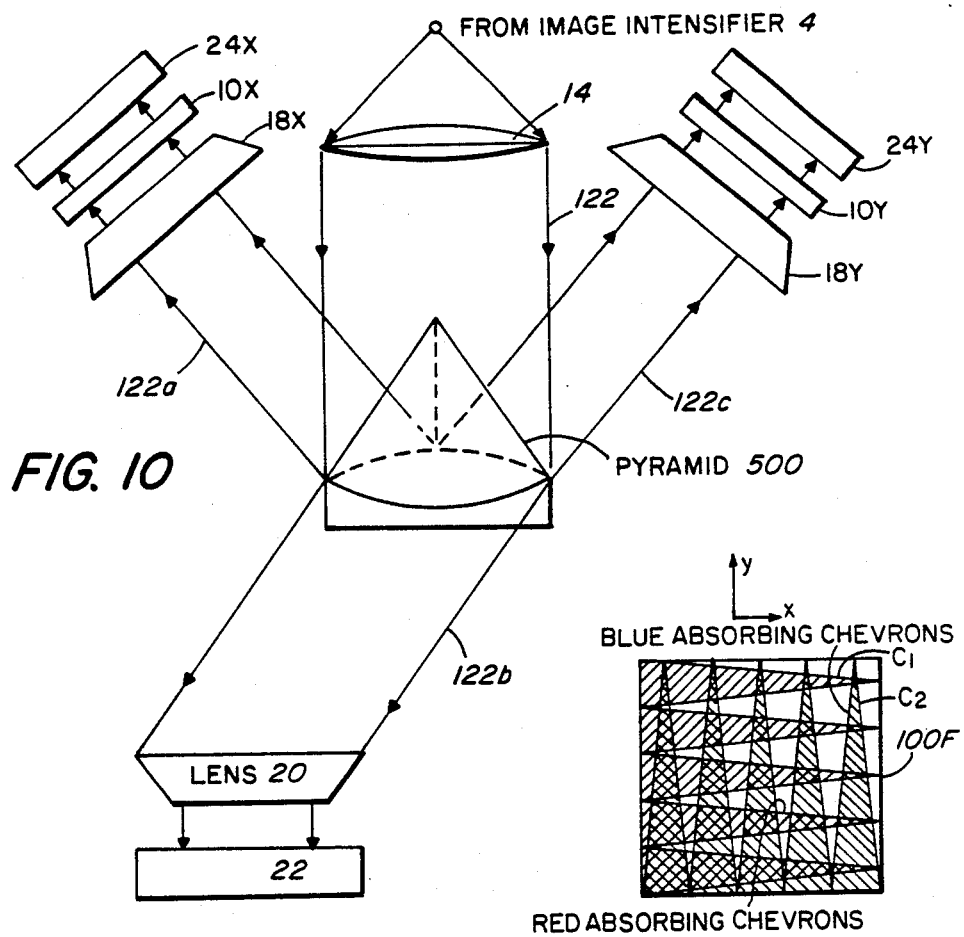
FIG. 10
FIG. 11
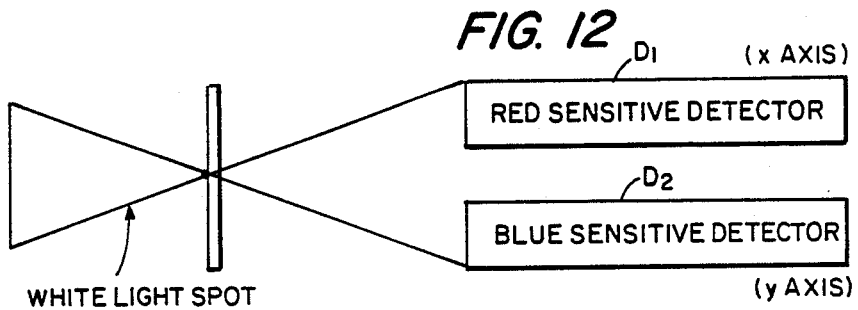
FIG. 12

OPTICAL WAVEFRONT SENSING SYSTEM

Description

1. Technical Field

This invention is in the field of adaptive optics systems and more particularly relates to apparatus for sensing wavefront distortions in a beam of light.

2. Background Art

Adaptive optics systems have been devised to improve resolution by correcting for distortions induced in light wavefronts by atmospheric disturbances and the imperfections of the receiving optical systems. These adaptive optics systems are either outgoing wave modulated systems or return wavefront measurement systems.

An essential element of such adaptive optics system is the wavefront sensor which senses wavefront distortion.

A phase sensitive type of wavefront sensor is the Shearing Interferometer developed by Hardy et al; "Real-time Atmospheric Compensation", *J. Opt. Soc. Amer.* 67, 360,1977. In this type of system, the input wavefront is interfered with by a laterally displaced, or sheared, replica of itself. The shear is provided by a set of rotating transmissive gratings, using the interference between the zero (unsheared) and the ±1 (sheared) diffraction orders. The rotation of the grating provides AC modulation of the interference fringes at each point in the pupil. Because the interference fringes between different combinations of orders are modulated at different multiples of the basic modulation frequency the desired interference terms may be separated electronically after detection. This system uses radial rotating gratings, so that the shear distance can be increased or decreased by moving the grating center toward or away from the focal area.

The grating consists of a circular glass disk with alternating clear and opaque radial lines extending from the center to the outer edge, producing a square-wave amplitude transmittance at any radius.

The information provided by the Shearing Interferometer of Hardy et al. is a set of local phase differences between points in the pupil plane separated by the shear distance. By measuring these phase differences in two dimensions using a set of x and y detector arrays, the full pupil can be sampled and the input wavefront approximately calculated.

A drawback of this system is that it uniquely determines phase differences only to within one wave of tilt between points in the pupil plane separated by the shear distance. Larger tilts are detected as having values less than a full wave. This results in a "so-called" two-pi ambiguity which is due to the periodic nature of the amplitude differences produced by phase differences in the two interfering wavefronts. This two-pi ambiguity may be considered as a limit on the dynamic range of the shearing interferometer as a wavefront sensor. This is because phase differences of larger than one wave between adjacent subapertures are not correctly sensed.

There is a further problem with the grating which imposes the AC carrier on the detected signals. When the object size is so large that its image on the rotating grating exceeds the grating spacing, the shear must be increased by repositioning the rotating gratings. In such situations, the information required to provide correct shear can only be obtained from some external measurement of object size.

Another type of wavefront sensor is the Hartmann-type sensor described in "Integrated Imaging Irradiance ($I^3$) Sensor, A New Method For Real-Time Wavefront Mensuration", *SPIE Vol.* 179 *Adaptive Optical Components II*, (1979) p. 27. This type of sensor avoids the two-pi ambiguity problem of the Shearing Interferometer of Hardy et al. In the Hartmann-type sensor, the pupil is divided into subapertures which are each imaged onto an x-y position sensor, such as a quadrant detector or "quad cell". The displacement of each spot from its center position gives the average wavefront tilt at its respective subaperture. Such an arrangement allows the measurement of many waves of tilt without ambiguity.

Unfortunately, the inherent simplicity of the basic Hartmann-type sensor is accompanied by several practical problems:

1. Extremely good alignment accuracy must be maintained between the pupil optics and the detector array, for any spot displacement implies an input wavefront error.

2. The system is essentially DC, requiring an external chopper, with its associated inefficiency, for AC operation.

3. As a centroid measuring system, the Hartmann sensor has significant sensitivity to the size and shape of the subaperture spot, i.e., to higher order wavefront distortions.

Consequently, the Integrating Imaging Sensor ($I^3$ sensor) described in U.S. Pat. No. 4,141,652 was developed to overcome some of the problems found in the Hartmann-type sensor.

In the $I^3$ sensor of U.S. Pat. No. 4,141,652 (shown in FIG. 2, labelled Prior Art, herein), a modulated reference beam 9 from a laser 6 is combined with an incoming beam of light 8. The combined beam 7 may optionally be nutated to produce a detectable AC signal. The combined beam is then divided into a plurality of beams 19 by a subaperture dividing component, such as prism 110, and is detected by an array 104 of photodetector cells for measuring the position of both the incoming beam and the reference beam. The difference between the relative position of the incoming beam and the reference beam is indicative of the distortion, or beam wavefront tilt, in the system and is used to provide a signal to compensate for distortion.

The use of the $I^3$ sensor for large compensation systems involving 200 or more subapertures is limited in part by the cost and complexities involved in the digital processing required to convert the analog output of the $I^3$ sensor to digital form and perform the required calculations to determine wavefront tilt or aberration. For example, with the $I^3$ sensor, 25 digital addition and 25 digital multiplication steps and 2 divisional steps are required for each subaperture to calculate wavefront tilt.

In an effort to avoid the foregoing limitations of the $I^3$ sensor, an adaptive optics system believed to be more suitable for use in large compensation systems was devised and described in U.S. Pat. No. 4,399,356 to Feinleib, et al., issued Aug. 16, 1983. The optical system in the '356 patent is substantially identical to that of the $I^3$ sensor up to the point where the combined beam 7 is focused from mirror 12. This may be seen by comparing FIG. 2 (The prior art $I^3$ sensor) with FIG. 3; the prior art '356 sensor. The point of departure occurs in FIG. 3 where the combined beam is focused at the tip of prism 110'. By way of contrast, it may be seen that in FIG. 2, the combined beam is not focused but impinges on all sides of reflective prism 110 which divides the light beam into separate beams, each reflected beam coming to a focus on respective detectors in the array 104.

The fact that each beam comes to focus on an individual detector after being divided by prism 110 means that the focused beam is spread by diffraction because the aperture of that beam is smaller than the full pupil aperture.

On the other hand, in the '356 wavefront sensor (as shown in FIG. 3), no matter how many subaperture elements are required, the combined beam is only focused at one point, that is, the tip of prism 110'. Thus the combined beam is focused from the full aperture input to the system before there is any subaperture division. The diffraction spread is therefore much less, so that the tilt measurement becomes more accurate.

However, even the '356 wavefront sensor requires a large number of digital arithmetic steps per subaperture for wavefront tilt measurement. For example, the '356 sensor requires 32 addition steps and 2 division steps per subaperture.

In both the $I^3$ wavefront sensor and the '356 sensor, the intensities of the subaperture light spot from a tilted wavefront subaperture is sensed by the subaperture detectors in array 104, FIG. 2, or arrays 4a–c, FIG. 3, and converted to digital signals and processed to determine the spot centroid, that is, the point of the spot which is the weighted mean of the spot intensity.

The centroid calculation may be accomplished in a number of ways. A typical way involves applying coordinate dependent weights, defined by a Weighted Pixel Algorithm (WPA) to digitize pixel intensity signals and summing the weighted intensities. The weighting may be viewed as a multiplication of the digitized pixel intensity signals by an array of constant weights. The sum of the weighted intensities is divided by the sum of the unweighted intensities to yield the centroid of the spot.

Thus, both the $I^3$ sensor and the '356 sensor are limited by the need to digitally perform the centroid calculation. For a wavefront sensor with hundreds or even several thousand subapertures, this calculation may be done with the requisite speed by state-of-the-art processors utilizing fairly standard digital technology. However, where significantly larger wavefront sensors are required, the processing overhead for digital centroid calculation becomes overwhelming.

Additionally, both prior art systems use many detector elements per subaperture. Since there is a fixed noise associated with each element, there is a considerable noise penalty in using multiple detectors. Secondly, in any sensor system that divides the photons in the input beam between various detectors, there is a very severe and inescapable noise penalty. This arises because of the increased photon shot noise in the divided beams. Any time the number of photons in a beam is reduced, the signal-to-noise ratio of that beam is also reduced in proportion to the square root of the reduction in beam intensity.

Accordingly, a need exists for a wavefront sensor system wherein the wavefront aberration correction calculation can be accomplished without the necessity of excessively large digital processing calculations and wherein the signal-to-noise performance is close to the photon shot noise limit of the undivided input beam.

DISCLOSURE OF THE INVENTION

In the method and apparatus of the present invention, an incoming light wavefront is first divided into a plurality of subapertures and the light spots from each subaperture are intensified. Once the spot images are intensified, the resulting light may be divided between detectors, spread over a large area, or partially absorbed in optical filters without incurring any penalty in photon shot noise. This is because the photon-to-photon gain of the intensifier may be made so large that even in the divided beams, the photon flux greatly exceeds that in the input beam.

These intensified spots are imaged on a cell of an analog filter array. This filter array encodes a predetermined function of the light spot intensity distribution onto the intensity of the beam transmitted from the filter array.

In the preferred embodiment of the invention, the filter array is a two dimensional mask having as many mask cells as subapertures. The light transmission characteristic of each mask cell varies linearly with position. Thus the transmitted intensity of each subaperture spot is weighted or encoded by the linear transmission characteristics of the cell as the light from each subaperture passes through the mask. For a given subaperture spot intensity, the output intensity from the mask filter, as sensed by the detector, is proportional to the spot position on the filter. Summing is accomplished by using a single photo sensitive detector for the total mask output which integrates the sensed pixel intensity over the whole area of the mask.

A beam divider is provided between the image intensifier and the filter array to reflect a portion of the subdivided and intensified beam to a reference detector. The wavefront detector intensity output is compared to the input intensity as measured by the reference detector to establish an output wavefront measurement signal independent of input intensity. Since this ratio is measured in the intensified beams, both the position accuracy and the dynamic range of the sensor may be increased by increasing the intensifier gain. The achievable signal/noise ratio in the wavefront measurement is limited only by the photon shot noise in the input beam. A ratio is thus constructed of the intensity of the light transmitted through the filter versus the intensity into the filter. This ratio is calculated digitally using the digitized signals from the two detectors. This ratio varies in response to spot motion, which in turn, varies with the wavefront tilt and can thus be used to measure such tilt.

It should be noted that in the prior art systems, the ratio of weighted to unweighted sums must also be calculated in the digital processor. In the present system, this ratio calculation is the full extent of the digital processing necessary per subaperture.

BRIEF DESCRIPTION OF THE DRAWINGS

FIG. 2 is a perspective view of the prior art $I^3$ sensor taken from FIG. 6 of U.S. Pat. No. 4,141,652.

FIG. 3 is a perspective view of the prior art wavefront sensor taken from FIG. 1 of U.S. Pat. No. 4,399,356.

FIG. 9 is a schematic of a two wavefront sensor in accordance with the invention.

FIG. 9A is a front view in the direction of lines 9—9 of FIG. 9.

FIG. 10 is an alternate embodiment of a two axis wavefront sensor.

FIG. 11 is a further alternate embodiment of a filter mask using different colored mask chevrons.

FIG. 12 is a schematic illustrating use of the mask of FIG. 11.

Best Mode of Carrying Out the Invention

I. WAVEFRONT SENSOR SYSTEM

A preferred embodiment of the invention will now be described in connection with FIG. 1 hereof.

Figure 1:
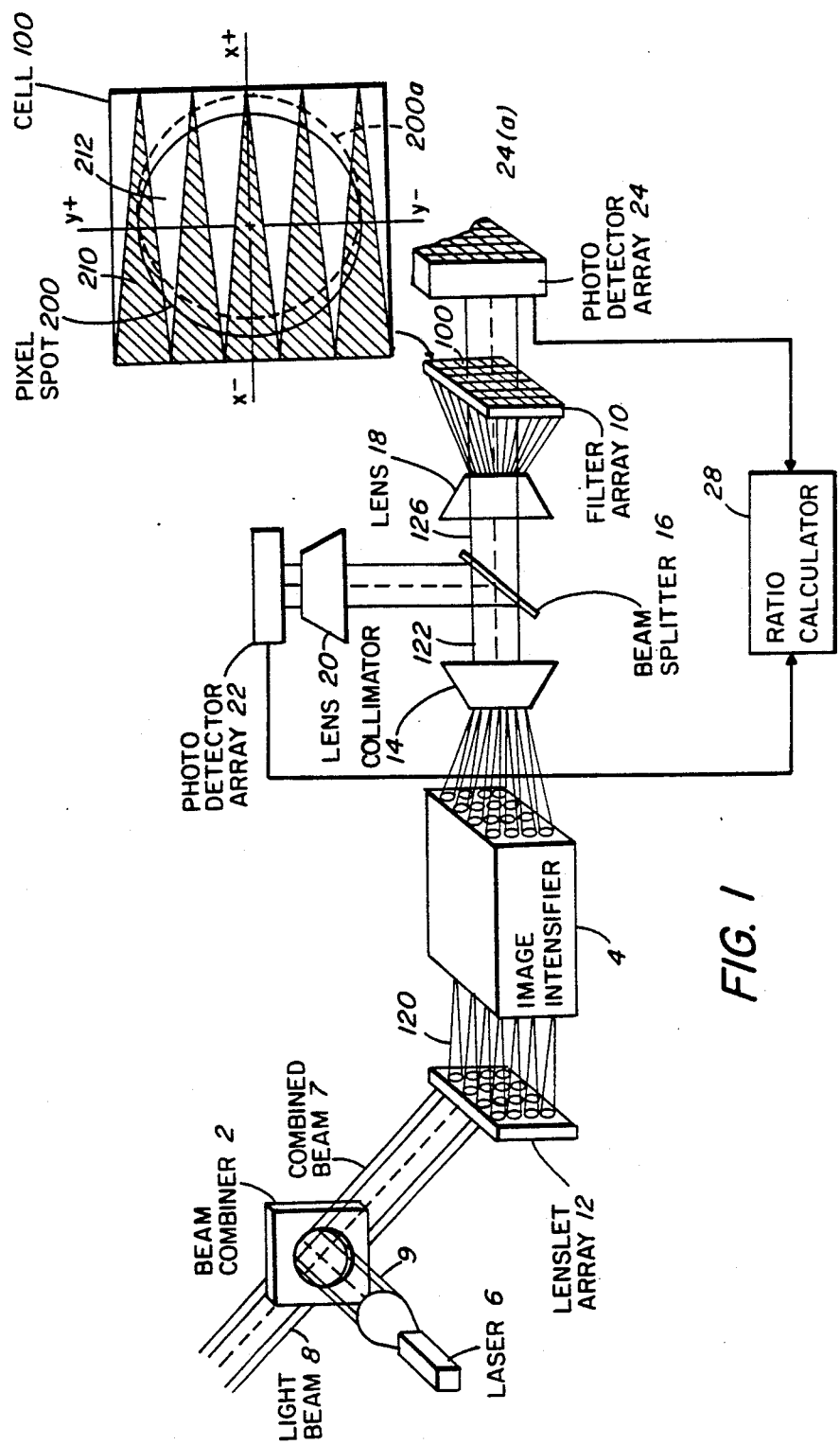
FIG. 1 is a simplified partly perspective schematic view of an improved wavefront sensor according to this invention with an enlarged view of one cell 100 of filter array 10.

In FIG. 1, a light beam 8 is shown entering the optical system. Light beam 8 may be a wavefront of light originating from a distant object, for example, a satellite or star, or may be light reflected from an object illuminated by a source located in proximity to the apparatus of FIG. 1.

Optionally, beam 8 may be combined in beam combiner 2 with a reference light beam 9 from laser 6. The optional reference beam 9 is preferably an amplitude modulated plane or spherical wavefront emitted by a laser source modulated by an acousto-optical modulator (not shown).

Reference beam 9 provides an optical and electronic self-calibration feature for wavefront tilt measurement.

The object of the system of FIG. 1 is to sense the shape of the optical wavefront of beam 8 at relatively high speeds approaching real-time. Once sensed, the measurements can be used prior to imaging the beam to correct the wavefront for atmospheric aberrations or other undesired perturbations, as described in U.S. Pat. No. 4,399,356.

The combined beam 7 from beam combiner 2 is imaged on lenslet array 12 which may comprise a two-dimensional array of individual lenses which divide the beam 7 into a plurality of subaperture beams 120 which are focused on image intensifier 4 forming a plurality of light spots thereon. Image intensifier 4 amplifies the intensity of each subaperture spot impinging on the face of the intensifier. The amplified subaperture images are collimated by collimator 14 and focused by lens system 18 onto the individual cells 100 of filter array 10.

An important aspect of the present invention is that the variable transmission filter 10 is placed after the image intensifier 4. This intensifier 4 produces enough gain to allow the output light to split between detectors without degrading overall performance. There is, however, a penalty to be paid in using the intensifier 4, since it is not a perfect amplifier and may introduce some noise into the target spot image. However, this intensifier generated noise may be made insignificant by increasing the intensifer gain and thus producing large photon fluxes on the mask array.

Filter array 10 is a mask having as many mask cells 100 as beam subapertures. Each subaperture spot 200 is focused onto an individual mask cell 100. As shown in the enlarged view of FIG. 1, each cell 100 has a linearly variable light transmission characteristic along one direction of spot motion. In the example of FIG. 1, the variable light transmission characteristic is horizontal, i.e., along the X-axis of the cell 100. The spot labelled 200 in solid lines is centered on the cell 100 and represents the spot produced by the untilted reference beam wavefront 9. The spot 200(a) represents the spot from a subaperture of the beam which is tilted in the positive X-direction.

The cell mask may be seen to comprise a plurality of alternate opaque and transparent elongated V-shaped patterns, or chevrons, 210 and 212, respectively, arranged such that the Y-dimension of the opaque chevrons 210 are wider in the minus X-direction and linearly diminish toward the plus X-direction while the converse applies to the transparent chevrons 212. A comparison of the centered spot 200 and shifted spot 200(a) vis-a-vis the chevroned mask reveals that the intensity of the light detected at photodetector 24 from cell 100 is greater for spot 200(a) than for spot 200 (assuming they were of equal intensity to begin with) since less of the spot 200(a) is intersected by the opaque chevron 210 than is the case with the centered spot 200. Similarly, a spot shifted in the minus X-direction is more attenuated by the opaque chevrons 210 resulting in a lower light intensity, as detected by photodetector 24.

In this manner, the requisite pixel weight multiplication required for spot centroid determination is performed by filter array 10 in a simple analog manner. Summing of the weighted pixels is accomplished by detector 24 which may comprise a plurality of photo-diodes 24(a) (one for each cell) in an array. The photo-diodes 24(a) integrate the intensity of each detected subaperture pixel received over the whole area of the photodetector. This array of photo-diodes may be formed of silicon diodes.

Thus, for a given subaperture input spot intensity to the mask 10, the output intensity sensed by each photo-diode 24(a) is proportional to the horizontal spot position on each cell 100 of the variable transmission filter mask 10. In order to make the sensor independent of the input intensity, the intensity is measured by a second detector array 22, that senses the subapertured input beam 122 after it is partially reflected by beam splitter 16.

A ratio is constructed in calculator 28 of the transmitted light intensity sensed by detector array 24 versus the input intensity sensed by detector array 22. That ratio varies in response to spot motion.

Note that in some applications, it may be advantageous to utilize lens 18 to spread the subaperture images from collimator 14 instead of simply focusing such images onto cells 100, as described above. In this manner, the spot size on the cell is increased and the light is spread over a larger portion of the cell to yield greater linearity.

II. FILTER ARRAY

Clearly, the heart of the wavefront sensor system of the invention is the filter array 10. It is this filter that accomplishes the pixel weight multiplication for the centroid calculation. Therefore, the performance of the wavefront sensor depends critically upon how well this filter can apply the requisite linear weighting of intensity. Filters exist which have variable density characteristics achieved by forming evaporated metallic films of variable thickness. With present known technology, the linearity of such filters is at most about 2%; which would introduce intolerable errors for most foreseeable applications of the present system. For this reason, a binary mask in the form of only opaque and transparent regions with no partially transmitting regions is believed to be preferable over a variable thickness filter.

Furthermore, it is desirable to make the V-shaped patterns quite small in the vertical dimension, i.e., 10 to 20 microns, to assure that the spot covers many chevrons, thus averaging out any errors that may occur by spot motion in the vertical or Y-direction. The size of the mask cell 100 should also be commensurate with the subaperture size of the lenslet array 12 used to divide the input pupil into subapertures.

Figure 5:
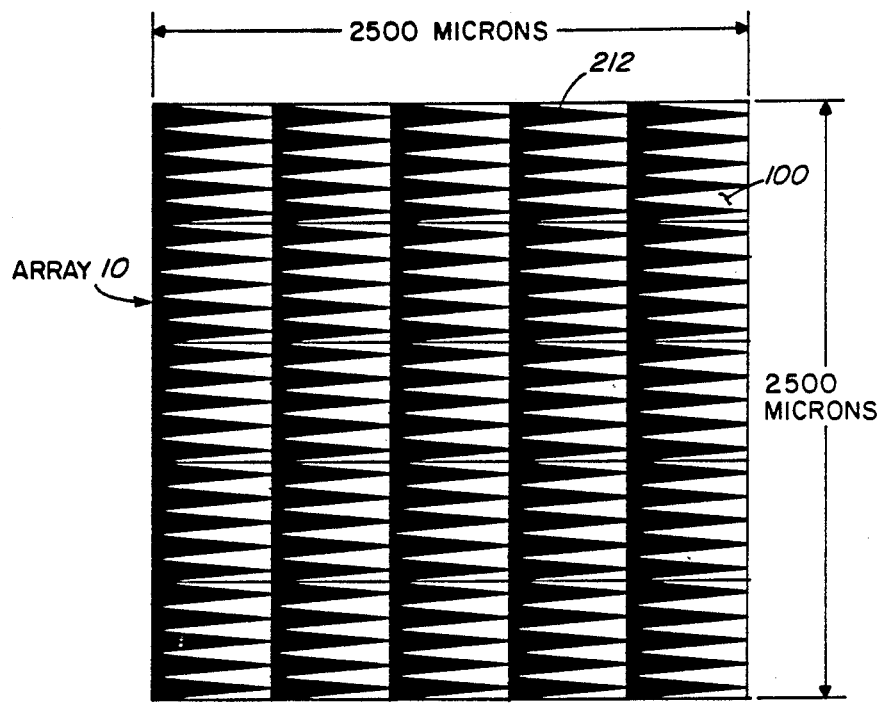
FIG. 5 is a front view of a filter array 10 in accordance with the invention.
Figure 4:
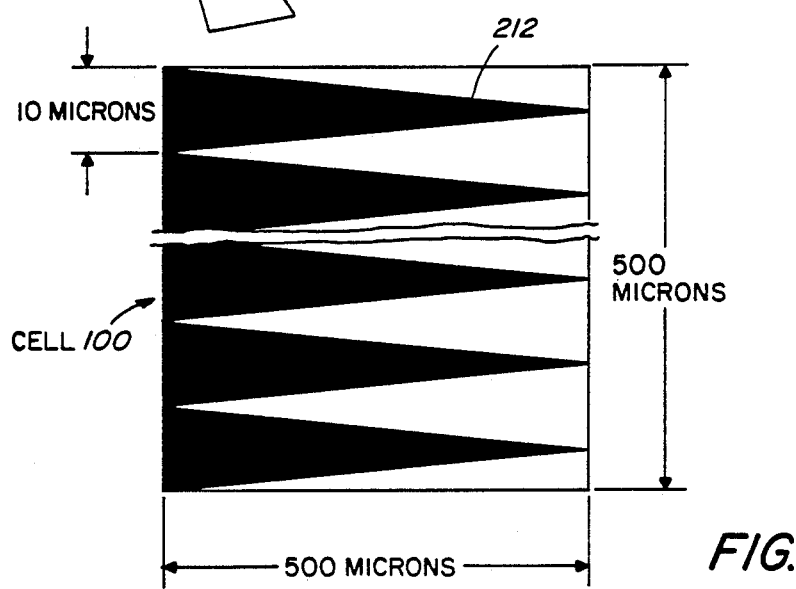
FIG. 4 is a front view of one filter cell 100 in accordance with the invention.

A test cell consisting of 500 micron square cells comprising fifty 10 micron by 500 micron, opaque chevrons, as shown in FIG. 4, was constructed and replicated in a 5×5 array on 500 micron centers, as shown in FIG. 5. Note that for simplicity, only 5 opaque chevrons 212 are shown per cell and that FIGS. 4 and 5 are not to scale. In actuality the horizontal scale of the chevrons is much greater. The test cell was constructed from a glass substrate upon which a thin film chrome coating was formed. Chevron-shaped opaque chrome elements were formed by etching the chrome film. The chevron element had a base width of 10 microns which linearly diminished to a point of 0.5 microns over a length of 500 microns to produce a transmission profile across the horizontal length of the cell which varies linearly from 0% to 100%.

Figure 6:
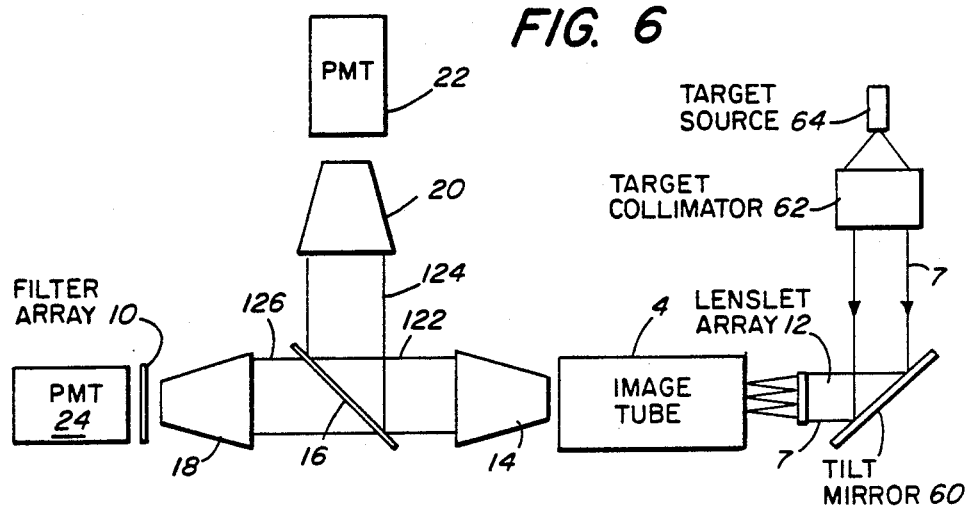
FIG. 6 is a schematic of a test system used to simulate the invention.

The test filter 10 of FIG. 5 was tested in the optical system of FIG. 6 which simulates the embodiment of FIG. 1. Note similar parts contain the same reference numerals in each of FIGS. 1 and 6.

The target source 64 produces a beam 7 which is collimated by collimator 62. The wavefront tilt of the beam may be changed by a 2-axis adjustable tilt mirror 60. The tilted collimated beam 7 is coupled to a lenslet array 12, which produces diffraction limited blur spots upon the photocathode of the image tube 4. The intensified blur spot array that appears at the output phosphor screen of the image tube is collimated by a fast (f/0.95) lens 14. This intensified collimated beam 122 passes through a partially reflective beam splitter 16 which sends 30% of the light to the photo-multiplier tube (PMT) 22 that represents the denominator channel of the ratio calculation of the wavefront sensor. The 70% transmitted beam 126 enters an identical f/0.95 lens 18 and the spots are imaged onto the filter array 10. The light transmitted by the filter 10 is detected by the second PMT 24. The output signals from the two PMTs represent the incident and transmitted beams of the wavefront sensor.

This optical system was operated in two modes. In the first mode, the target source simulator 64 was operated to produce high light levels. The output currents of the two PMTs 22 and 24 were recorded as the wavefront tilt was changed. Because the photon flux at the filter array 10 was very high in this first mode (on the order of $10^6$ photons/sec.), this mode allowed testing of the filter 10 without considering the added noise due to photon statistics.

Figure 8:
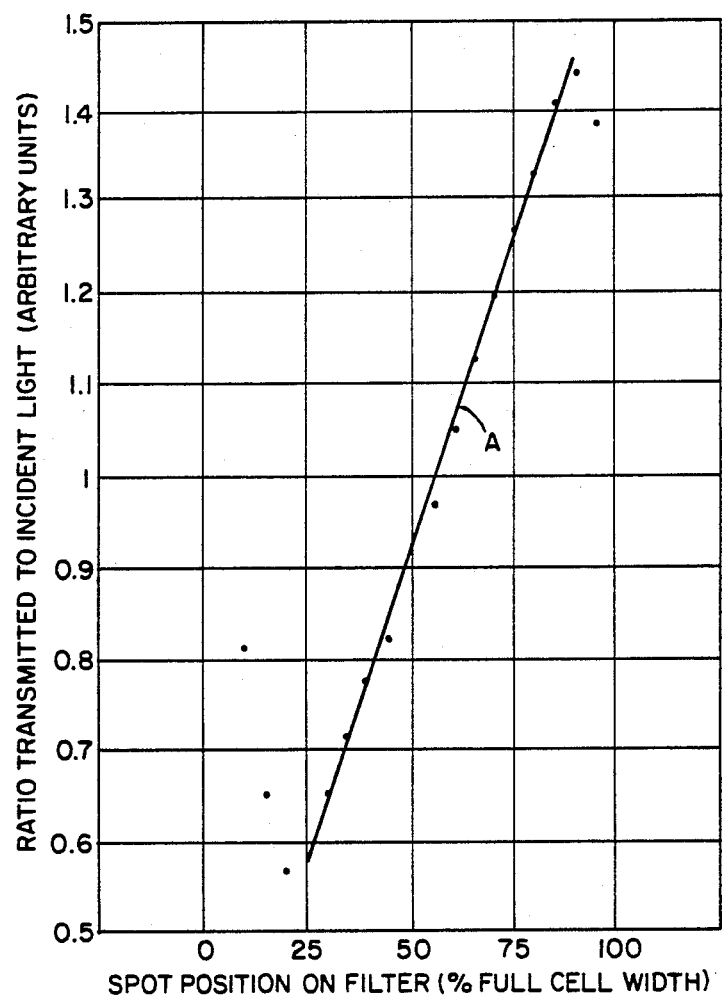
FIG. 8 is a plot of wavefront sensor output versus spot position for a prototype filter array.

FIG. 8 is a plot of the ratio of the transmitted to incident light versus the spot position on the filter of a typical data set obtained as the spots were moved through one cell of the filter. Fitting a linear relation line A to the central portion of the data shows that the RMS errors in the tilt predicted by the system are 0.6% over a dynamic range of 3.2 waves of tilt of the input beam. The somewhat restricted dynamic range indicated is believed due, in part, to the spillover of light from adjacent subapertures or cells. The linearity errors are believed mainly due to random errors in the PMT data recording system which includes an eight-bit A/D converter.

Figure 7A:
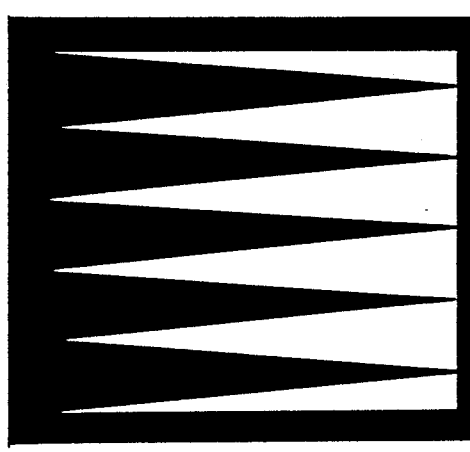
FIG. 7 A-E show alternate embodiments of filter cells.

The spillover problem may be alleviated by utilizing a mask cell, as shown in FIG. 7a, with an opaque border 115 around each cell 100'.

In the second mode of operation, the light level of the target source simulator 64 was reduced to the level at which it became possible to detect individual intensified photons at the PMTs 22 and 24. The charge pulses from the PMTs were integrated, digitized and ratioed singly, allowing the data to be accumulated a single input photon at a time. The error in the accumulated centroid measurement was monitored as a function of photon number. In this case, the centroid error was found to be photon statistics limited because the digitizer error had been eliminated. It was found that the required centroid accuracy could be achieved with less than 300 detected input photons and an image tube gain of 12600. The linearity of the filter 10 was found to be better than 0.3%, close to that predicted by numeric calculations.

In summary, the performance of a prototype filter of the invention was found to exceed the requirements of typical wavefront sensor applications.

III. ALTERNATE FILTER ARRAY EMBODIMENTS

Other embodiments of the filter array described in Section II will now be described in connection with FIGS. 7B–E. For simplicity, in each case only one of the plurality of filter cells is shown.

A. BAR

Figure 7B:
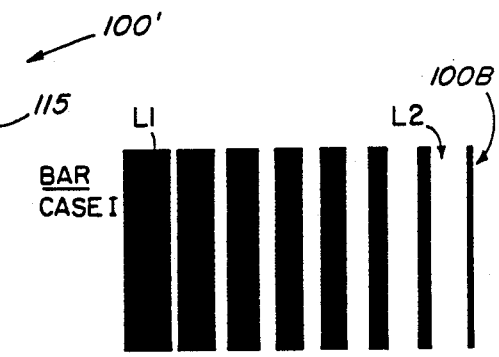

In FIG. 7B, the linear transmission characteristic is achieved by creating a filter mask cell 100B with parallel alternate opaque lines or bars L1 and transparent lines L2 of variable width and spacing.

B. DOTS

Figure 7C:
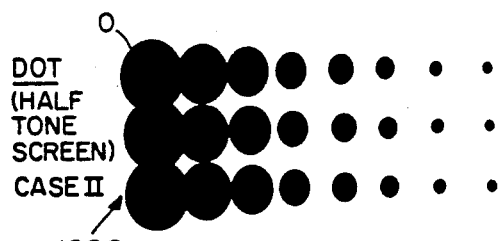

The filter cell 100C of FIG. 7C consists of opaque circles or dots "O" of varying diameters (as in a halftone reproduction) that serve to block portions of the transmitted beam.

C. NON-LINEAR

While the transmittance characteristics of the cells of FIGS. 7A–C vary linearly; any of these embodiments may also be adapted to other than linear weighting algorithms.

From the above discussion, it should now be clear that the action of the filter mask is to encode in the transmitted intensity a given function of the spot intensity distribution. Analytically, the fraction of light transmitted through the filter, $F_T$, is given by the equation $$F_T = \frac{\int_{cell} I_S(x,y) T(x,y) dx\, dy}{\int_{cell} I_S(x,y) dx\, dy} \quad (1)$$

where $I_S(x,y)$ is the spot intensity distribution, $T(x,y)$ is the transmission function of the filter cell, and the integration is made over the area of the filter cell.

It is therefore possible to conceive of a variety of possible transmission functions. In the above described embodiments, $T(x,y)$ is a linear function of x position, i.e., $$T(x,y) = x/W \quad (2)$$

wherein W is the filter cell width. Thus, Eq. 1 become:

$$F_T = \frac{1}{W} \frac{\int_{cell} I_S(x,y) \times dx\, dy}{\int_{cell} I_S(x,y) dx\, dy} \quad (3)$$

which is the definition of the one-dimensional centroid or first moment of the spot intensity distribution. This centroid is typically the quantity that is desired as the output of a Hartmann-type wavefront sensor.

There are, however, situation where non-linear transmission functions may be useful in wavefront sensing. For example, it may be shown analytically that if there exists a step discontinuity in the phase of the wavefront across a subaperture the second moment of the spot intensity distribution may be used to measure the size of that discontinuity. Such a measurement could be used to align or phase adjust adjacent mirror segments whose boundary lies within the subaperture. The second moment L of the spot intensity distribution, in one dimension is:

$$L = cell\, I_S(s,y)\, x^2 dx\, dy \quad (4)$$

Clearly, this may be implemented by constructing a filter mask whose transmission function is quadratic given by:

$$T(x,y) = x^2/W^2 \quad (5)$$

D. QUADRATIC

Figure 7E:
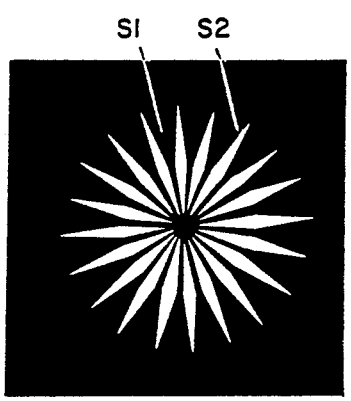
Figure 7D:
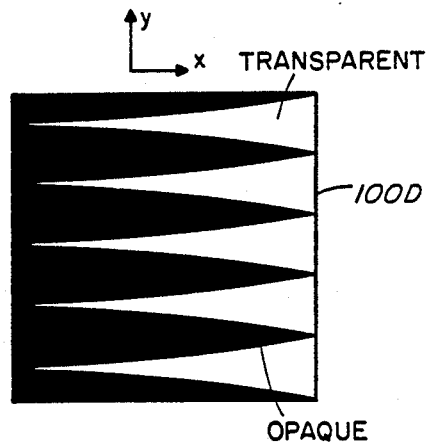

Such a quadratic weighting proportional to spot displacement in the horizontal direction is shown in the mask cell 100D of FIG. 7D. In FIG. 7D, the width of the opaque portions of the pattern vary as the square of the distance in the horizontal, or X- direction. Such masks may be used to calculate higher order moments of light distribution.

E. AXIAL

Masks with axial symmetry, as shown in FIG. 7E, have application in cases where the direction of spot displacement is not important but only the magnitude of that displacement need be measured. In the mask cell 100E of FIG. 7D, alternate opaque and transparent radial spokes $S_1$ and $S_2$, respectively, extend radially from the center of the mask cell.

IV. TWO AXIS WAVEFRONT SENSOR

It should be noted that the wavefront sensor, previously described in connection with FIG. 1, is only useful in determining wavefront tilt in a single axis since the transmission characteristics of the filter array cells only vary linearly in one axis, i.e., the horizontal or X-axis.

To provide for vertical or Y-axis tilt measurement, the beam from collimator 14 of FIG. 1 is divided into three separate beams. Such an embodiment will now be described in connection with FIGS. 9 and 9A. As may be seen in FIG. 9, three re-imagers 18X, 18Y and 20 are placed in the path of the image intensifier beam after it has been collimated by collimator 14. As may be seen in FIG. 9A, the re-imagers are arranged in a triangular area to tri-sect the collimated beam. Thus, the collimated beam is effectively divided into three identical separate beams 122(a), (b) and (c), which impinge on lenses 18X, 20 and 18Y, respectively.

The image beam from lens 18 is projected onto the X coordinate weighting mask array 10X which is identical to the mask 10 of FIG. 1 and processed as in FIG. 1. The reference beam 124 is imaged by lens 20 directly onto photodetector array 22, also as described in connection with FIG. 1.

The additional Y-axis beam channel is provided by projecting the third beam 122(c) onto the Y-coordinate weighting mask array 10Y via lens 18Y. Mask array 10Y is identical to mask array 10X except that the chevrons 212Y and 210Y of each cell 100Y are oriented 90° from those of cell 100X, as shown in the enlarged view.

Optionally, a bundle of tapered fiber optic plugs 90X, 90Y may be provided between the mask 10X; mask 10Y, respectively, to provide image reduction where the filter cell size cannot be made small enough to mate directly with the pixel size of detectors 24 and 24Y.

Thus, a spot motion in the vertical or Y direction is weighted by mask 10Y in the same manner as previously described in connection with FIG. 1. The weighted pixel intensity from the mask is detected by photodetector array 24Y and ratioed with the unweighted reference beam intensity determined by photodetector array 24Y.

An alternate two axis wavefront sensor is shown in simplified schematic form in FIG. 10 wherein like parts contain identical numeral designations. In this embodiment, a three faceted mirror pyramid 500 is placed in the image plane of the collimated beam 122 from image intensifier 4 to divide the beam into three beams 122a, 122b and 122c, each smaller than the collimated beam produced by collimator 14. This embodiment has an advantage in that the focal lengths of the re-imaging lenses 18X, 18Y and 20 can be shorter than that of the collimator 14, thereby providing a linear scale reduction.

A third alternative for beam splitting is to simply utilize a second beam splitter 16 in addition to that shown in FIG. 1 to provide threeway division. The disadvantage of this structure is that the re-imaging lenses must be able to accommodate the full collimated beam size. Since the collimator must be an exceptionally fast lens, the beam diameter is large compared to the collimator focal length. Therefore, if the re-imagers are to accept this full beam, their focal lengths cannot be much different from that of the collimator. Since the magnification of the system is set by the ratio of these focal lengths, this splitting method does not allow minification of the spots onto the filters; as may be required if the detector diodes are smaller than the mask cell size.

V. TWO DIMENSIONAL DETECTION WITH SINGLE MASK

Another class of mask cells comprise patterns which are not wholly opaque, as shown in FIG. 11. The chevron mask cells in FIG. 11 have chevrons $C_1$ and $C_2$ that selectively transmit various wavelengths of light. For example, the $C_1$ chevrons absorb light in the red wavelength and the $C_2$ chevrons absorb light in the blue wavelength. The mask cell 100F may be used to calculate, for example, the centroid of the distributions of only those wavelengths of light at which the chevrons are opaque. One use of such a mask would be for a two-axis centroid calculation, in the form of two chevron patterns, $C_1$ and $C_2$, of differing wavelength opacity characteristics placed at 90° to each other in the same mask cell, as shown in FIG. 11. The transmitted light is sensed by two detectors, $D_1$ and $D_2$ (FIG. 12) with optical transmission filters matched in wavelength to the two chevron patterns $C_1$ and $C_2$. Thus, the centroid of a white light spot may be sensed in both axes with only one filter mask array.

VI. VARIABLE TRANSMITTANCE MASK

Figure 13:
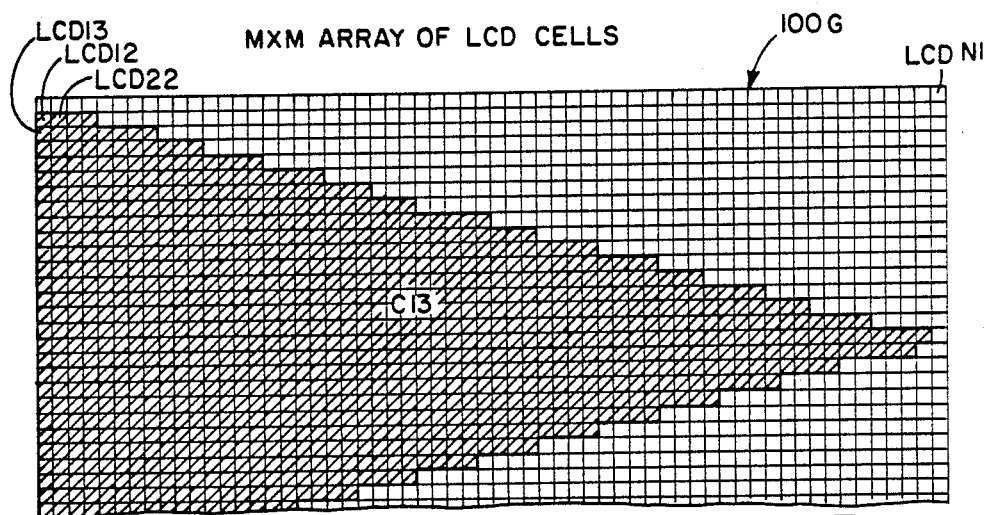
FIG. 13 is a partial plan view of a filter mask cell 100G in which the transmittance characteristics are variable.

It is also possible to construct filter masks whose transmittance characteristics may be electrically varied. Such a mask may be fabricated of liquid crystal devices (LCD's) as shown in FIG. 13 wherein the opacity of each LCD may be electrically varied by row and column electronic impulses. In this way, the weighting applied to a given pixel may be varied in response to an external signal. This would allow filter mask embodiments that perform functional multiplications, such as convolutions of an optical signal with an electrical one. In the apparatus of FIG. 13, the cell 100G comprises opaque chevrons C13 approximated by enabling selected LCD's from the an NXM array of LCD's.

VI. ELECTRONIC MASKS

Figure 14:
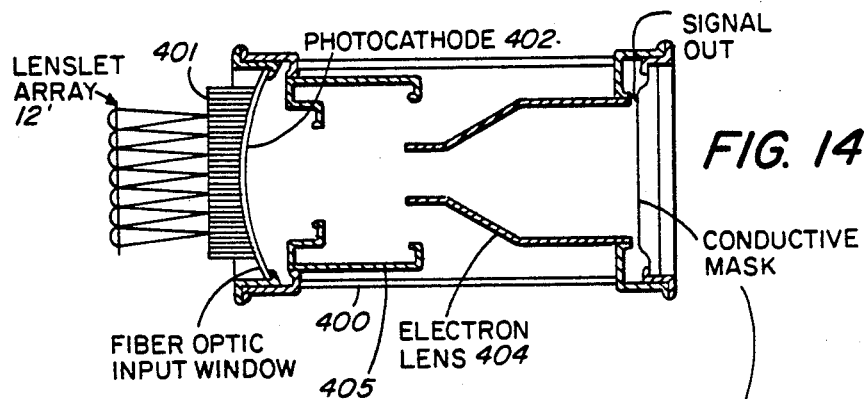
FIG. 14 is a sectional schematic view of an embodiment of the invention wherein the filter array is incorporated into the screen of an image intensifier.
Figure 15:
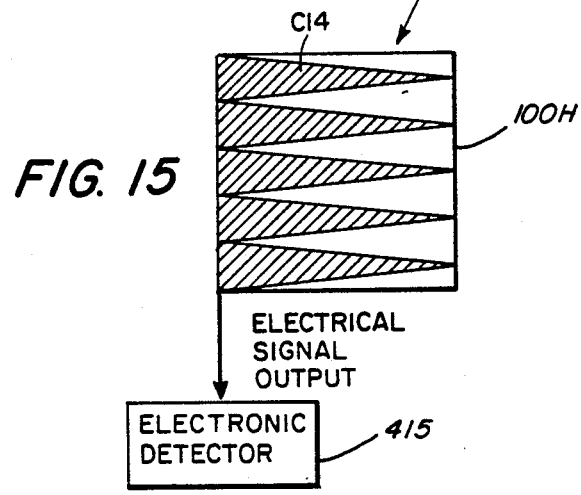
FIG. 15 is a plan view of the conductive screen mask of FIG. 13.

An analogous class of embodiments is contemplated in which the masks are embodied in electron optical systems rather than in photon optical systems. For example, as shown in FIGS. 14 and 15, the phosphor output screen of a well-known image intensifier 400 is replaced by an array 101 of electrically conductive chevron patterns C14 (FIG. 15) forming cells 100H. In this manner, the centroid calculation is performed directly on the electron image that is present at that position.

To do this, the output of lenslet array 12' is focused on a spot imager 401 comprising a fiber optic input window coupling the light spots directly to photocathode 402. Accelerating electrode 405 increases the energy of the electron beam and electron lens 404 focuses the electronic beam from the photocathode onto the electrically conductive mask 10' to produce an intensified electrical signal output from the mask which represents the spot intensity from each subaperture encoded by a function proportional to the electron collecting pattern of the conductive mask. These signal outputs from each cell 100H are detected in detector 415.

Figure 16:
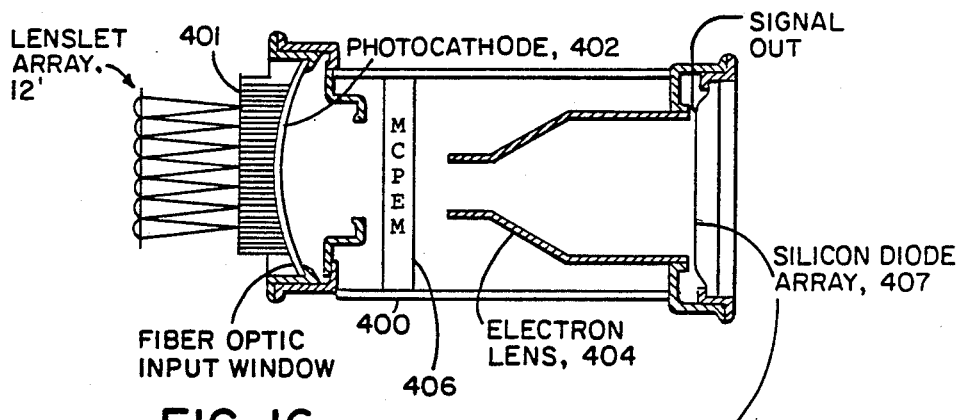
FIG. 16 is a sectional schematic view of an alternate embodiment of FIG. 14 wherein the accelerating electrode 405 of FIG. 14 is replaced by a microchannel-plate electron multiplier 406.
Figure 17:
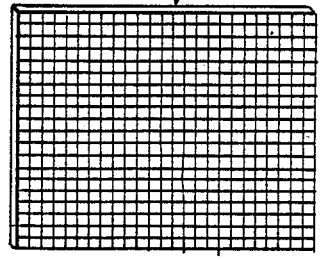
FIG. 17 is a plan view of the silicon diode array.

Other optical embodiments of the invention may be similarly converted to analogous electronic optical arrangements. Such systems should provide simplifications of the optical layout of a wavefront sensing apparatus. For example a micro-channel-plate electron multiplier 406 may be substituted for the accelerating electrode 405 in FIG. 14. The conductive mask shown in FIGS. 14 and 15 may be replaced with an array of silicon diodes to be used with the micro-channel-plate electron multiplier illustrated in FIG. 16. This diode array 407 for use in the electron optical system embodiment is illustrated in FIG. 17.(as shown in FIG. 16)

Equivalents

This completes the description of the preferred embodiments of the invention. Those skilled in the art may recognize other equivalent embodiments to those described herein; which equivalents are intended to be encompassed by the claims attached hereto. For example, the optical embodiments herein utilize the transmission characteristics of an optical mask to encode a function of spot intensity distribution. It is contemplated that the reflective characteristics of a photomask may be used equally as well. Accordingly, in the claims, the broader term "directivity" characteristics will be used to encompass either case.

We claim:

1. An optical wavefront sensor for detecting wavefront aberration in a beam of light comprising:
   (a) beam divider means for dividing said beam of light into a plurality of subapertures;
   (b) image intensifier means responsive to light from each subaperture for increasing the intensity of such light;
   (c) mask means having a plurality of cells, each of said cells having a directivity characteristic which varies in at least one direction;
   (d) imaging means for imaging the intensified light from each subaperture onto the respective cells of said mask means;
   (e) detector means for detecting the intensity of the light received from each cell of said mask means.

2. The sensor of claim 1 wherein the directivity characteristic is a linear function.

3. The sensor of claim 1 wherein the directivity characteristic is a quadratic function.

4. The sensor of claim 1 wherein the directivity characteristic is a function of the square of the distance across the cell in a predetermined direction.

5. The sensor of claim 1 wherein the directivity characteristic varies as a linear function of radial displacement from the center of the cell.

6. The sensor of claim 1 wherein the mask means comprises a linear series of alternate opaque and transparent chevrons and the directivity characteristic is transmissive.

7. The sensor of claim 1 wherein the mask means comprises a linear series of alternate opaque and transparent parallel lines.

8. The sensor of claim 1 wherein the mask means comprises a linear series of alternate opaque and transparent circles.

9. The sensor of claim 1 wherein the directivity characteristics of the mask means may be electrically varied.

10. Apparatus comprising:

(a) a beam divider means for dividing a light beam into a plurality of subapertures of light;

(b) image intensifier means responsive to light from each subaperture for amplifying the intensity of such light;

(c) array means comprising a plurality of cells each having a directivity characteristic which varies in at least one direction;

(d) imaging means for imaging the intensified light from each subaperture onto the respective cells of the array means;

(e) first detector means for detecting the intensity of the light received from each cell of the array and producing a first signal corresponding thereto;

(f) second detector means for detecting the intensity of the light received from the image intensifier and producing a second signal corresponding thereto;

(g) calculator means for calculating the ratio of the first and second signals.

11. The apparatus of claim 10 wherein the array means includes two sets of cells, one such set varying in a first direction and the second such set varying in a direction orthogonal thereto.

12. The apparatus of claim 10 wherein said beam divider means comprises an array of lenslets positioned in the path of said beam.

13. An optical wavefront sensor for detecting wavefront aberration in a beam of light comprising:

(a) means for dividing a beam of light into a plurality of subaperture components;

(b) lens means for imaging said subaperture components;

(c) photoelectronic means responsive to the imaged light from each subaperture to convert said imaged light into electron beams;

(d) means for increasing the energy contained in said electron beams;

(e) electron sensitive means for determining the spatial distribution of energy in said electron beams; and (h) electronic means for determining the wavefront aberration from the response of said electron sensitive means.

14. The apparatus of claim 13 wherein the said photoelectronic means consists of a photocathode.

15. The apparatus of claim 13 wherein the said energy increasing means consists of an accelerating electric potential.

16. The apparatus of claim 13 wherein the said energy increasing means consists of a micro-channel-plate electron multiplier.

17. The apparatus of claim 13 wherein the said electron sensitive means consists of conductive electrodes in a mask pattern positioned in said electron beams.

18. The apparatus of claim 13 wherein the said electron sensitive means consists of an array of silicon diodes.

19. A method for detecting wavefront aberration in an input beam of light comprising:

(a) modulating a reference beam;

(b) combining said reference beam with an input beam to form a combined beam;

(c) dividing said combined beam into a plurality of subaperture components;

(d) imaging said subaperture components on an image intensifier;

(e) increasing the intensity of such light in said image intensifier;

(f) imaging the intensified light from each subaperture onto photosensitive means;

(g) detecting the light distribution characteristics of each of the intensified focused subaperture beams; and (h) determining the wavefront aberration from the response of said photosensitive means.

20. The method of claim 19 wherein the size of discontinuities in the wavefront is determined by detecting the second moment of the light distribution in said focused beam.

21. The method of claim 19 wherein the intensified light in step (f) is intentionally de-focused to enlarge the image size.

22. An optical wavefront sensor for detecting wavefront aberration in a beam of light comprising:

(a) beam divider means for dividing said beam of light into a plurality of subapertures;

(b) image intensifier means responsive to light from each subaperture for increasing the intensity of such light;

(c) imaging means for imaging intensified light from each subaperture onto an image spreading means;

(d) position sensitive detector means for detecting the position of the spread image for each subaperture.

23. The sensor of claim 22 wherein the position sensitive detector means is an array of filter means having directivity characteristics which vary in one direction.

24. A mask for encoding a predetermined function onto the intensity of a beam of light passing through the mask comprising an array of cells each cell having a plurality of alternate opaque and transparent chevrons.

25. The mask of claim 24 wherein the chevrons vary in width in a linear manner.

26. The mask of claim 24 wherein the chevrons vary in width in a quadratic manner.

27. The mask of claim 24 wherein the cells comprise glass substrates upon which a metal film is deposited and the transparent chevrons are formed by etching away portions of the metal film.

* * * * *